United States Patent
Canfield et al.

(12) 
(10) Patent No.: US 6,711,901 B1
(45) Date of Patent: Mar. 30, 2004

(54) ROCKET MOTOR NOZZLE ASSEMBLIES HAVING VACUUM PLASMA-SPRAYED REFRACTORY METAL SHELL THROAT INSERTS, METHODS OF MAKING, AND ROCKET MOTORS INCLUDING SAME

(75) Inventors: Alan R. Canfield, South Ogden, UT (US); John K. Shigley, Odgen, UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 09/765,781

(22) Filed: Jan. 19, 2001

Related U.S. Application Data (60) Provisional application No. 60/177,218, filed on Jan. 21, 2000.

(51) Int. Cl.[7] .................................................. F02K 1/00
(52) U.S. Cl. ..................................... 60/770; 239/265.11
(58) Field of Search ........................ 60/770; 239/265.11; 29/890.1

(56) References Cited

U.S. PATENT DOCUMENTS

| | | | |
|---|---|---|---|
| 3,139,672 A | 7/1964 | Schruggs | |
| 3,226,929 A | 1/1966 | McKenna | 60/35.6 |
| 3,228,186 A | 1/1966 | Allen | 60/35.6 |
| 3,250,070 A * | 5/1966 | Milewskii | 60/35.6 |
| 3,265,314 A | 8/1966 | Helms | |
| 3,419,441 A | 12/1968 | McAllister | 148/6.3 |
| 3,441,217 A | 4/1969 | McIntosh | |
| 3,688,988 A | 9/1972 | Howison | 239/265.15 |
| 3,853,586 A | 12/1974 | Olcott | 117/37 R |
| 3,980,105 A | 9/1976 | Myskowski | 138/140 |
| 4,729,512 A | 3/1988 | Laing | 239/265.11 |
| 6,209,312 B1 | 4/2001 | Singer | 60/271 |

FOREIGN PATENT DOCUMENTS

FR             1357065     *   7/1964

OTHER PUBLICATIONS

J. Scott O'Dell et al., Development of Near Net Shape Refractory Metal Components Utilizing Vacuum Plasma Spray, *Tungsten Refractory Metals and Alloys 4*, Int'l. Conference, 1997.

* cited by examiner

*Primary Examiner*—Ehud Gartenberg
(74) *Attorney, Agent, or Firm*—TraskBritt (57) ABSTRACT

The rocket motor nozzle assembly of this invention includes a throat insert and a carbon or silica protective eyelid. The throat insert has a carbon throat support and a refractory metal shell. The shell is positioned radially inside the throat support to cover the inner surface of the throat support. The protective eyelid covers a sufficient portion of the forward surface region of the shell and the underlying converging portion of the throat support to protect these components against particle impingement. The protective eyelid extends sufficiently far forward along the converging/diverging pathway to cover and protect the forward face or edge of the throat insert and prevent the combustion gases from passing under the throat insert and reaching the radially outer surface of the throat insert. However, the protective eyelid leaves the throat surface region of the shell exposed to the converging/diverging pathway.

23 Claims, 2 Drawing Sheets

ROCKET MOTOR NOZZLE ASSEMBLIES HAVING VACUUM PLASMA-SPRAYED REFRACTORY METAL SHELL THROAT INSERTS, METHODS OF MAKING, AND ROCKET MOTORS INCLUDING SAME

RELATED APPLICATION

The benefit of priority is claimed based on U.S. Provisional Application No. 60/177,218 filed in the U.S. Patent & Trademark Office on Jan. 21, 2000, the complete disclosure of which is incorporated herein by reference.

BACKGROUND OF THE INVENTION

1. Field of the Invention

This invention relates to a rocket motor nozzle assembly having a throat insert that includes a vacuum plasma-sprayed refractory metallic component for preventing the throat from receding, and an ablative component constructed and arranged to reduce erosion under the refractory metallic component. This invention also relates to a rocket motor engine assembly comprising the nozzle, and to methods of making the rocket motor nozzle assembly and engine assembly.

2. Description of the Related Art

Conventionally, solid rocket motor propellants contain, among other things, oxidizer and fuel components immobilized within a polymeric binder. The solid propellant is cast as a grain within a rigid outer casing or shell of the rocket motor combustion chamber. A heat insulating layer and a liner are usually interposed between the grain and the outer casing to protect the outer casing from the high operating temperatures associated with rocket motor operation and to provide enhanced grain-to-case bonding. The solid-propellant grain is typically configured as either a center perforated grain or an end burner grain.

During firing, the oxidizing agents immobilized within the solid-propellant grain drive combustion reactions to form large quantities of combustion products, which are expelled from the rocket motor through a nozzle in fluid communication with the combustion chamber. The amount of thrust produced by a rocket motor is proportional to the exit gas velocity squared. Nozzles are designed to accelerate the combustion product gases from the propellant grain to the maximum velocity at the exit.

To achieve this end, nozzles usually have forward walls converging to a throat region and have aft walls diverging from the throat region to a larger exit area to form a converging/-diverging nozzle configuration. The nature of compressible gases is such that a converging/-diverging nozzle increases the exit gas velocity and thereby thrust. The proportions of the mass flow pathway, particularly the ratio of area at the exit plane to area at the throat, establish how efficiently the nozzle converts pressure in the mass flow stream to thrust produced by the motor. It is within the purview of those skilled in the art to design a nozzle throat to optimize the ratio of exit area to throat area.

As described above, an insulating layer and liner are typically placed between the propellant and the outer casing of the combustion chamber to protect the outer casing from the extremely high temperatures at which the rocket motor operates. Likewise, the nozzle throat must also be designed to withstand the elevated temperatures and pressures, reactions with the combustion products, and the high velocities at which the combustion products pass over the nozzle inner surface.

Carbon-based and silica-based materials are highly advantageous for use as nozzle insulation due to their excellent ablative properties, inexpensive cost, and relatively low weight. Intuitively, a lesser weight nozzle assembly is desirable because a lesser weight nozzle assembly imparts a lesser weight penalty to the rocket motor than a heavier nozzle assembly, thereby increasing the distance the rocket motor assembly can travel. As referred to herein, carbon-based and silica-based materials include, but are not limited to, carbon, silica, or graphite bulk and composite materials with constituents previously subject to carbonization or graphitization, known as carbon/carbon, graphite/carbon, and cloth, fiber, or powder-filled phenolic composites, and also a large array of metal or silicon carbides.

It is widely acknowledged in the industry, however, that carbon- and silica-based nozzle throats tend to recede, especially at high operating temperatures and pressures. The material loss in the nozzle throat is generally attributed to one or more mechanisms. For example, in the case of silica-cloth phenolics and the like, material loss is attributed to thermal decomposition and melting of the liner material, which can cause the decomposed layer to be sheared off by the high-velocity gas stream. In the case of carbon cloth phenolics and the like, material loss can result from the thermal decomposition of the liner material, which forms pyrolysis gas and char due to chemical reactions of decomposed material (char) with the combustion gases. Typical carbon-carbon materials and the like may undergo chemical reaction with the reactive species in the combustion products.

The recession of the nozzle throat inner surface during motor operation is a source of several problems in rocket operation. As the nozzle throat material recedes, the exit area to throat area ratio (or expansion ratio) diminishes, thereby decreasing the efficiency of the nozzle and causing loss in motor performance. Additionally, rough nozzle surfaces, which tend to form during nozzle recession, have been shown to undergo recession at faster rates than smooth surfaces. Thus, the nozzle throat recession process can be characterized as a self-perpetuating phenomenon. Another problem is having higher than predicted nozzle recession. Calculations for determining payload weight and corresponding motor designs must be accurate to ensure that the payload will reach its intended target. The calculations necessary for ascertaining rocket dimensions and payloads are dependent upon many variables, including nozzle throat diameter. In-flight variations of nozzle throat diameter due to recession can reduce motor performance.

To address the shortcomings of carbon- and silica-based nozzle throats, refractory metal and metal alloys are occasionally used in rocket motors, especially as the throat insert. Examples of such refractory materials are tungsten and its alloys.

However, the weight penalty and expense associated with the presence of the tungsten and other refractory metals often make these refractory materials impractical and uneconomical for applications involving bulky throat insert cross sections. Additionally, refractory metals exposed to hot combustion exhaust gases and particles are subject to tensile stresses due to thermal shock early in motor burn when thermal expansions near the rapidly heated exposed surfaces are restrained by cooler regions of the cross section farther from the exposed surfaces. Indeed, surface heating can be so intense that temperature gradients of thousands of degrees per inch are possible. Such thermal stresses in both the axial and tangential (or hoop) directions can produce thermal fractures in the nozzle component, and potential ejection of the throat insert from the motor.

It would, therefore, be a significant advancement in the art to provide a nozzle assembly that takes advantage of the low weight of carbon- and/or silica-based materials and the erosion resistance of metals and alloys, yet avoids significant nozzle recession experienced by carbon- and silica-based materials and reduces the risks associated with thermal stresses encountered by thick refractory materials, even when the operating conditions are characterized by high temperatures and pressures.

SUMMARY OF THE INVENTION

This invention realizes the above-discussed advancement in the art. In accordance with the principles of this invention, this and other advantages are attained by the provision of a rocket motor nozzle assembly defining a converging/diverging pathway with a throat of restricted cross-sectional area and operatively engageable with a rocket motor to receive the combustion products of the rocket motor, pass the combustion products through the converging/diverging pathway, and discharge the combustion products to propel and/or divert the rocket motor assembly.

In accordance with an embodiment of this invention, the rocket motor nozzle assembly comprises a throat insert comprising a carbon-based throat support and a vacuum plasma-sprayed metal shell comprising at least one refractory metal and/or refractory metal alloy having a melting temperature above 2700° C., preferably above 2760° C. The assembly further comprises a carbon- or silica-based protective liner (also referred to herein as an "eyelid") covering a forward face of the throat insert, and an aft skirt configured as a diverging truncated cone and extending aftwardly from the throat insert. Generally, the throat support is annular and has a forward face or edge, a radially inner converging portion that converges into a minimum cross-sectional area portion of the throat, and a radially inner diverging portion aft of the throat. The shell is also annular and is positioned radially inside the throat support to cover at least a portion, and optionally all of the radially inner surface of the throat support. In particular, the shell comprises a forward radially inner surface region covering the converging portion of the throat support, a throat surface region covering the minimum cross-sectional area portion of the throat support and exposed along the converging/diverging pathway, and an aft radially inner surface region covering the diverging portion of the throat support.

In this embodiment, the carbon- or silica-based protective eyelid covers a sufficient portion of the forward surface region of the shell and the underlying converging portion of the throat support to protect these components against particle impingement and erosion. The carbon- or silica-based protective eyelid extends sufficiently far forward along the converging/diverging pathway to cover and protect the forward face or edge of the throat insert and prevent the combustion gases from passing under the throat insert and reaching the radially outer surface of the throat insert. Protection of this radially outer surface of the throat insert from combustion gases is necessary to eliminate the risk of nozzle failure that might otherwise occur if combustion gases were to reach underneath the throat insert. However, in accordance with the principles of this invention, the protective eyelid does not cover the throat surface region of the shell, thereby leaving the throat surface region of the shell exposed to the converging/diverging pathway. Since the refractory metal shell is much less susceptible to erosion than the carbon- or silica-based material forming the eyelid, the throat area, which is defined by the refractory shell, is less likely to recede and thereby diminish the exit area to throat area ratio (or expansion ratio) of the nozzle.

This invention is also directed to a rocket motor assembly equipped with the above-described nozzle, and a method of making and using the rocket motor nozzle and assembly.

These and other features and advantages of the present invention will become apparent from the following detailed description of the invention when taken in conjunction with the accompanying drawings which illustrate, by way of example, the principles of this invention.

BRIEF DESCRIPTION OF THE DRAWINGS

The accompanying drawings serve to elucidate the principles of this invention. In such drawings.

DETAILED DESCRIPTION OF THE INVENTION

Figure 2:
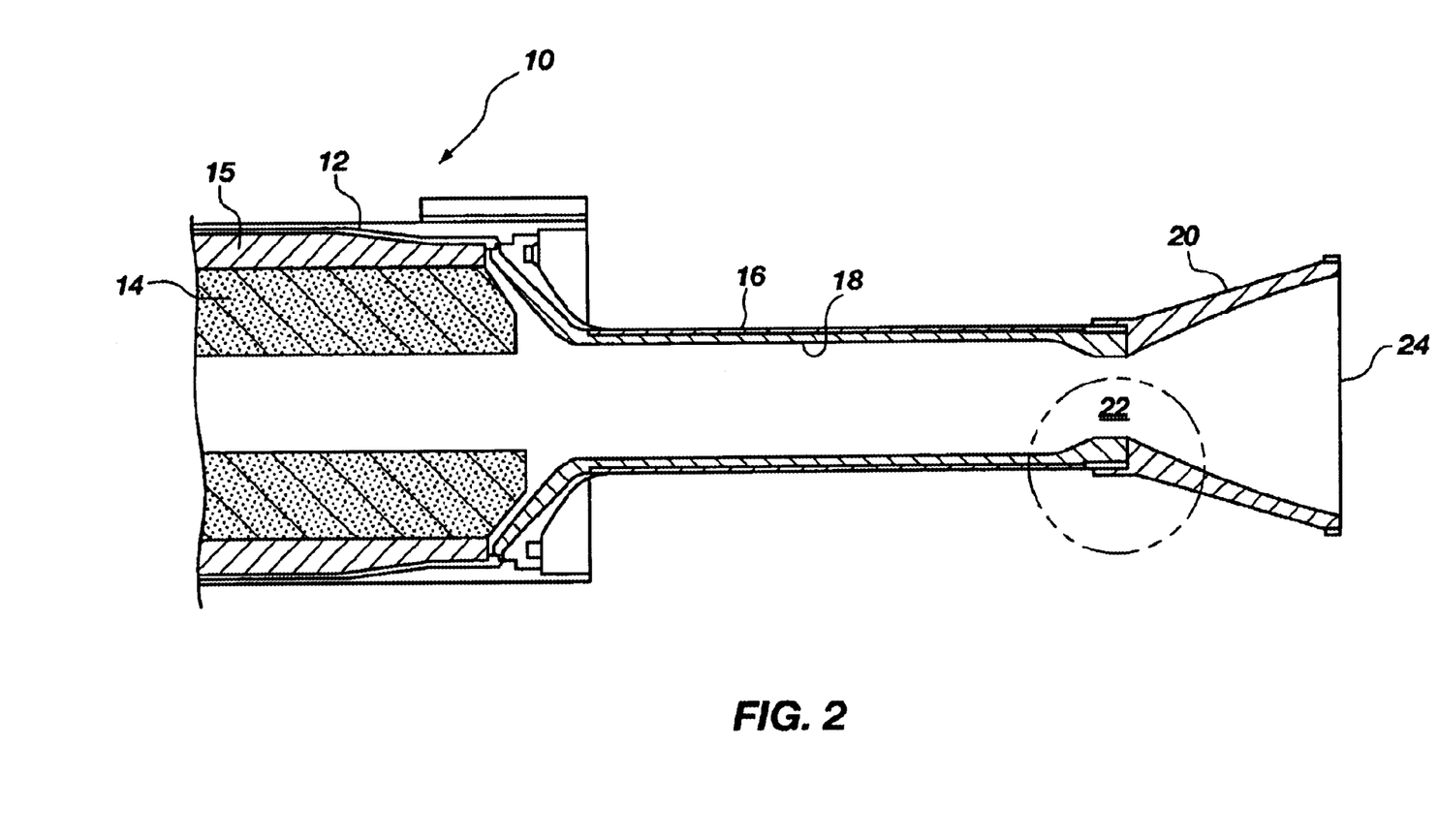
FIG. 2 is a sectioned view of a rocket motor assembly comprising a rocket motor case loaded with a solid propellant and the rocket motor nozzle assembly of FIG. 1.

The general structure of a rocket motor engine is shown in FIG. 2, in which the engine is generally designated by reference numeral 10. The illustrated rocket motor engine 10 includes a case 12 in which a rocket motor propellant 14 is housed, a nozzle assembly 20, and a blast tube 16 connecting the case 12 to the nozzle assembly 20. In the illustrated embodiment, the rocket motor propellant 14 is in the form of a solid propellant grain. As shown in FIG. 2, the case 12 and the rocket motor propellant 14 commonly are separated by an insulation layer 15, as well as a liner (not shown). Similarly, the blast tube may also be lined with insulation, such as depicted in FIG. 2 and designated by reference numeral 18. The insulation layer 15 and the liner (not shown) serve to protect the case 12 from the extreme conditions produced by the rocket motor propellant 14 as the rocket motor propellant 14 undergoes combustion reactions and is exhausted through exit region 24 of the nozzle assembly 20. The liner serves the additional functions of bonding the rocket motor propellant 14 to the insulation layer 15 and the case 12, and creating a seal to prevent the penetration of hot combustion gases to the case 12. Methods for loading the rocket motor propellant 14 in the rocket motor case 12, such as by conventional casting and curing techniques, are well known to those skilled in the art, such that the skilled artisan can readily practice such techniques with this invention without undue experimentation. Methods of insulating and lining the case 12 are also well known in the art.

Although the illustrated embodiment is of a blast tube solid rocket motor nozzle, it is to be understood that the nozzle assembly of this invention can be applied to various other types of rocket motors that are mounted to or close to the case 12, and that do not contain a blast tube 16. The principles of this invention can also be applied to hybrid systems and liquid oxidizer/liquid fuel systems (engines).

The illustrated nozzle assembly 20 defines a converging/diverging pathway having a throat of restricted cross-sectional area. The throat is generally designated by reference numeral 22. During operation of the rocket motor engine 10, combustion products, including hot exhaust gases, are generated by the rocket motor engine 10 and passed through the blast tube 16 and the throat 22. As the hot combustion products pass through the throat 22, exit velocity of the combustion gases is increased to thereby increase thrust.

Figure 1:
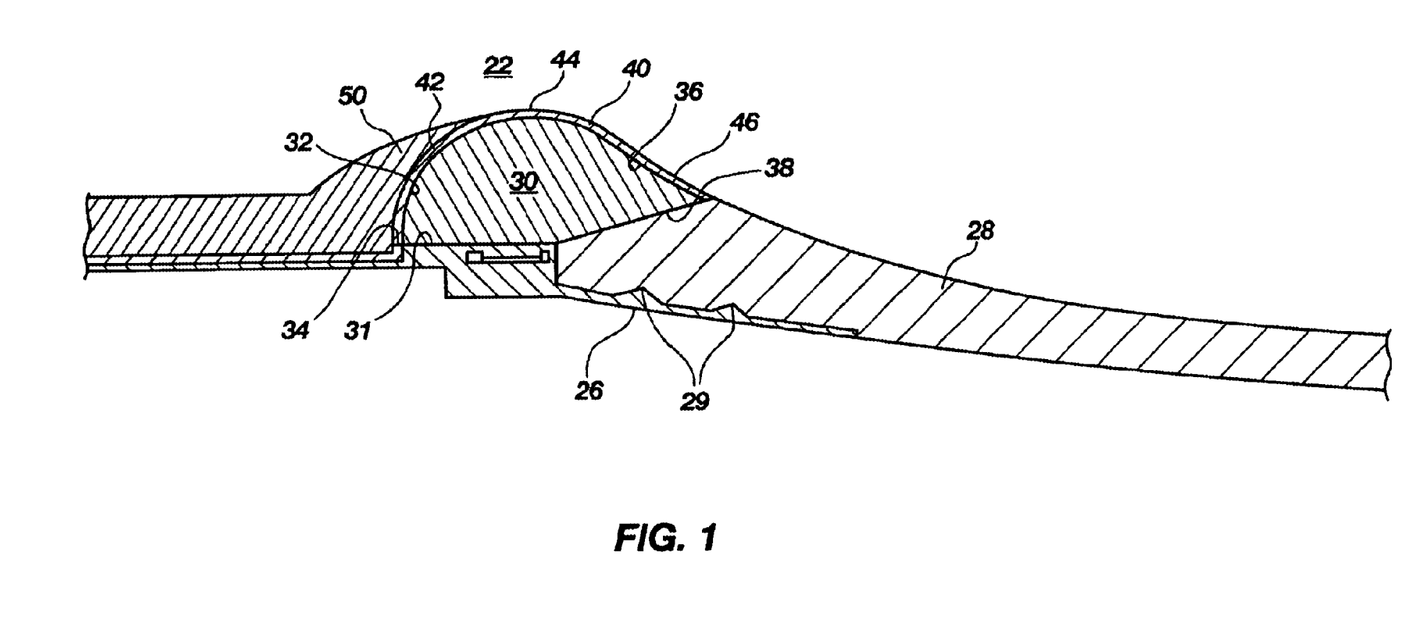
FIG. 1 is a sectional view of a rocket motor nozzle assembly according to an embodiment of this invention.

Referring now more particularly to FIG. 1, the throat 22 is generally defined by an annular throat insert that comprises an annular throat support 30 and an annular shell 40. The shell 40 is positioned radially inside of the throat support 30 to cover at least a substantial portion of the radially inner surface of the throat support 30. The throat support 30 is made of one or more carbon-based materials, exemplary compositions of which are described in much greater detail below. The throat insert is annular in shape, and has a substantially flat outer surface 31 that seats against outer support shell 26, which is typically made of a metal. The radially inner surface of the throat support 30 includes a forward converging portion 32 that extends from a forward edge (or face) 34 of the throat support 30 to a minimum cross-sectional area portion at the throat 22. In the illustrated embodiment, the forward converging portion 32 curves towards the outer diameter of the rocket motor nozzle 20 for achieving better retention of the throat support 30. Aft of the throat 22, the inner surface of the throat support 30 expands along a diverging portion 36.

Extending aftwardly from aft end surface 38 of the diverging portion 36 of the throat insert is an aft skirt 28 configured as a diverging truncated cone. The aft skirt 28 and aft end surface 38 abut one another and can be connected by any conventional technique, including epoxy adhesives, other adhesives, and/or mechanical fastening means. The aft end surface 38 is machined at an angle relative to the aft skirt 28 to enhance the retention of the throat insert against high internal pressures. The aft skirt 28 is supported by outer support shell 26, which (although not shown) may coextend along the entire length of the aft skirt 28. The aft skirt 28 engages the outer support shell 26 via screw threads 29.

The shell 40 covering the throat support 30 is made of one or more refractory metals and/or alloys having melting temperatures above 2700° C. (4918° F.), preferably above 2760° C. (5000° F.), more preferably above 3040° C. (5500° F.). Such refractory materials include tungsten, rhenium, tantalum, and alloys containing one or more of these refractory metals. Although tungsten is the preferred refractory metal, tungsten is still more preferably used as an alloy with rhenium, which improves ductility. Preferably, the alloy is 75–95 wt % tungsten, with the balance (5–25 wt %) rhenium. The thickness of the shell 40 is generally dependent upon the size of the nozzle employed. For a smaller nozzle having a throat of about 12.7 cm (5 inches), the shell 40 thickness can be in a range of from about 0.1 cm (40 mils) to bout 0.15 cm (60 mils). For larger nozzles, the shell 40 thickness can be generally as large as about 0.3 cm (⅛ inch). Generally, the shell 40 thickness m of selected within or outside of these ranges, so long as the selected thickness does not result in undue amounts of thermal stress that significantly risk nozzle failure. The thermal stresses encountered by thermal expansion of the shell 40 are also mitigated by the throat support 30, which is formed of carbon-based materials that decompose/char during motor operation. The refractory metal shell 40 is able to expand more easily into the throat support 30 once the support 30 has undergone decomposition/charring.

In the illustrated embodiment, the annular shell 40 has a forward surface region 42 covering the entire forward converging portion 32 of the throat support 30. It is to be understood, however, that the forward surface region 42 of the shell 40 need only extend over the entire forward converging portion 32, i.e., the forward surface region 42 does not have to extend all the way to the forward edge 34 of the throat support 30. Formed contiguously and integrally with the forward surface region 42 is a throat surface region 44 of the shell 40. Similarly, an aft surface region 46 of the shell 40 is formed contiguously and integrally with the throat surface region 44. Although in the illustrated embodiment the aft surface region 46 covers the diverging portion 36 of the throat support 30 in its entirety, it is to be understood that the aft surface region 46 is not required to extend to the aft end surface 38 of the throat support 30. However, the aft surface region 46 should extend sufficiently far along the diverging portion 36 of the throat support 30 to eliminate step-down erosion or at least reduce step-down erosion to non-appreciable levels. Step-down erosion will reduce motor thrust and should be minimized.

The throat surface region 44 defines the throat 22 of minimum cross section. In this manner, the throat surface region 44 is left exposed to hot combustion products passing through the nozzle assembly 20 pathway during firing of the motor. Exposing the refractory metal of the shell 40, and in particular the refractory metal of the throat surface region 44 of the shell 40, at the throat 22 is an important feature of this invention. Refractory metals are much more resistant to step erosion than carbon-based materials. By defining the throat 22 with the refractory annular shell 40, and not covering the throat surface region 44 of the shell 40 with carbon- or silica-based materials, the throat 22 remains substantially constant in cross-sectional area throughout engine operation because the refractory metal of the throat surface region 44 is not significantly eroded. As a consequence, improvements in performance and predictability of the rocket motor engine 10 can be realized.

The forward surface region 42 of the shell 40 engages in an abutting relationship with insulation 18 of the blast tube 16. (Alternatively, in the event that the forward surface region 42 does not extend to the forward edge 34 of the throat support 30, thus leaving part of the forward converging portion 32 uncovered, then the insulation 18 would abut against the uncovered part of the forward converging portion 32 of the throat support 30.)

Covering the forward surface region 42 of the annular shell 40 and the forward converging portion 32 of the throat support 30 is an annular protective liner 50, which in the cross-sectional view of FIG. 1 has the general appearance of an eyelid. The protective liner 50 is formed from one or more carbon-based and/or silica-based ablative materials, which may be the same or different from the material from which the throat support 30 is made. The protective liner 50 extends sufficiently far forward towards the insulation 18 to cover the forward edge 34 of the throat insert, so as to prevent combustion products passing along the converging/diverging pathway during operation of the rocket motor from passing under (radially outward from) the forward edge 34 and reaching between the throat insert and the outer support shell 26. The protective liner 50 also extends over the entire forward surface region 42 and forward converging portion 32 to protect these components from particle impingement and heating and to provide some combination of boundary layer enhancement and/or transpiration cooling to the refractory shell 40. Because the protective liner 50 is made of a carbon-based and/or silica-based material that recedes during operation of the rocket motor, the protective liner 50 is preferably of sufficient thickness that the liner 50 is not completely eroded away during engine operation. It is to be understood that although the protective liner 50 is illustrated as extending over the entire forward surface region 42 of the liner 40, the protective liner 50 may extend only partway along the forward surface region 42.

Importantly, the protective liner 50 does not cover the throat surface region 44, which is made of a refractory material that is less susceptible to erosion than the protective liner 50. As a consequence, the throat 22 is defined by the refractory metals/alloys of the throat surface region 44 of the shell 40. Therefore, the throat 22 is less prone to erosion from the combustion products passing along the converging/diverging pathway of the throat 22 during operation of the rocket motor engine.

The production of the rocket motor nozzle of this invention will now be described in more detail below. Although various techniques can be used to make the refractory shell 40, preferred for this invention is a vacuum plasma spraying technique, which involves spraying material onto a mandrel of the desired shape and subsequently removing the mandrel. The plasma is formed by passing gases such as argon and/or hydrogen through an electric arc positioned between an anode and cathode. The gas passing through the electric arc is ionized and generates temperatures on the order of 16,650° C. (30,000° F.). Refractory metal powder is entrained in a gas carrier, such as argon gas, and injected from a gun into the hot plasma. The powder is melted by the plasma and accelerated towards the surface of the mandrel. If appropriate, the mandrel may be rotated during spraying. Advantages of the vacuum plasma spraying technique include the ability to form near-net-shape components that do not require laborious machining.

Various techniques known in the art can be practiced to form the nozzle annular throat support 30 about the radially outer surface of the refractory shell 40, as well as to form the protective liner 50 and the aft skirt 28. One highly advantageous technique is described in detail below.

In general, the refractory shell 40 can be insulated with the carbon-based throat support 30 by arranging a curable pre-preg around the outer surface of the refractory shell 40 at a level of compaction sufficiently low to permit voids to be generated therein during subsequent curing of the pre-preg, then curing the prepreg at a pressure sufficiently low to permit evolving gases to form voids in the pre-preg as the pre-preg cures to form the throat support 30. Generally, the pressure at which the pre-preg is cured is maintained at not more than about 150 psig.

The prepreg can be arranged by winding a pre-preg tape or applying a pre-preg cloth about the refractory shell 40. For example, the pre-preg tape can be applied using a tape wrap process in which the pre-preg tape is heated, such as by a hot air source, to soften the tape. The hot air can be supplied to the tape at a temperature in the range of about 177° C. (350° F.) to about 482° C. (900° F.), more typically in the range of about 177° C. (350° F.) to 288° C. (550° F.). The tape may be debulked as it wraps onto the refractory shell 40, for example, by setting a roller in close proximity to the refractory shell 40. In general, the tapes may be debulked less than 80%, more particularly less than about 50%. To accomplish this debulking, the pressure applied by the roller and the refractory shell 40 is generally less than about half (50%) of the lowest pressure recommended by pre-preg vendors (100 to 300 pounds per inch of tape width) and about 50 pounds per inch of tape width is exemplary of such a lower pressure. The tape is cooled and preferably hardened as the tape is wrapped about the refractory shell 40. Carbon dioxide (or other coolant) from a liquid holding tank can be applied to the wrapped tape as the tape wraps about the refractory shell 40. This cools and hardens the wrapped tape about the refractory shell 40 whereby the throat support 30 is formed.

During curing, the pressure can be vacuum or up to less than about atmospheric pressure. In accordance with one embodiment of the present invention, the wrapped throat support 30 and refractory shell 40 can be vacuum bagged using a vapor impermeable vacuum bag, such as a nylon vacuum bag, sealed with vacuum putty. In the vacuum bagging procedure, a suitably thick or suitably layered bleeder material is used so that any resin bleed from the curing material does not clog vacuum lines or adversely affect the vacuum bag itself. In this regard, a bleeder material may comprise, for instance, at least one layer of perforated film; at least two layers of cotton mop; or at least two layers of bleeder material, such as a polyester bleeder material (about 10 oz or about 16 oz./sq. yard of polyester bleeder material). The vacuum bagged material is then cured using a selected maximum vacuum. By preference, the vacuum provides the only pressure applied during the curing, and low pressures on the order of sub-atmospheric up to about, preferably less than, atmospheric can be used, such as a vacuum equivalent of about 12.5 psia to less than about 14.7 psia, although the pressure selected will depend on the prevalent atmospheric pressure. Still lower pressures can also be used. In general, however, the low pressure vacuum can, for instance, be in a range of from about 12.5 psia to about 14 psia, and more particularly in a range of from about 12.5 psia to about 12.7 psia. The cure pressure is adjusted to maintain or provide the desired cured component density.

During the curing step, it is possible to use thermal cycling to cure the pre-preg. In the temperature cycling, various temperatures or temperatures and residence times are selected to ensure the satisfactory curing of the composite article. An exemplary temperature cycle involves heating and cooling the pre-preg at a rate of about 0.55° C. (1° F.) per minute. Alternatively, a multi-stage temperature cycle can be used. For instance, the thermal cycling can be programmed to have a first hold at about 82° C. (180° F.) for a residence time of about 1.25–1.5 hours, a second hold at about 104° C. (220° F.) for a comparable residence time as the first hold, and a third hold at a temperature in a range of from about 154° C. (310° F.) to about 160° C. (320° F.) for about 60 or more minutes for each inch of component wall thickness. The residence time at a holding temperature will be a function of process variables, such as the thickness of the material to be cured. The determination of suitable curing cyclings, including both residence times and cure temperatures, is within the purview of those skilled in the art and can be determined without undue experimentation.

Suitable carbon-based pre-preg materials are generally characterized by a reinforcement (fibers, cloth, tape) to which is impregnated with a thermosetting resin. Suitable reinforcement can comprise a wide variety of fibers or filaments (whether continuous or staple) known in the art. These fibers and filaments include, but are not limited to, glass fibers, boron filaments, boron nitride, silicon carbide, graphite (carbon) filaments and high modulus organic filaments, particularly organic filaments of the nylon, polyethylene, and aramid type. Examples of high modulus organic filaments include, but are not limited to, poly(benzothiazoles) and poly(aromatic amides) which are commonly referred to simply as "aramids". Aramids include poly(benzamides) and family of materials sold by E. I. DuPont under the trademark KEVLAR. As an example of carbon filaments useful in this invention, there may be mentioned, for example, Amoco Performance Product's T-300 and Toray's T-800H and T-1000G carbon fibers. Suitable carbon-based thermosetting resins include, for example, phenolic resins, and epoxy resins (especially those based on diglycidyl ethers of bisphenol A). In principle, bis-maleimide resins, polyurethanes, polyesters, and the like, and any combination thereof may also be employed as the carbon-base resin or a component thereof. By preference, for the composite materials requiring erosion resistance, good ablative performance, and good across ply tensile strength required for rocket nozzle components, a phenolic resin matrix resin for the pre-preg is used. Suitable commercially available curable phenolic resins are SC-I008 (Borden) and 91-LD phenolic resin (Stuart-Ironsides). Epoxy-based pre-pregs are not preferred for rocket motor nozzle components.

A carbon cloth impregnated with a curable phenolic resin can also be used. The carbon cloth can be rayon-based, polyacrylonitrile (PAN) based, or pitch-based. These types of pre-pregs include the industry standard density pre-pregs such as Mx-4926 (28–38% resin, 8–16% filler, the remainder including cloth reinforcement) which is a rayon based carbon phenolic pre-preg from Fiberite. Other suitable materials from Fiberite include PAN-based pre-pregs, such as those sold under the designations MX-4946 or MX4920 which both used a T300 fiber/yarn which is a vendor designation for a yarn having a modulus of 300 million. Other "T" type fiber/yarn products can be used. These materials can include a filler, and generally include carbon powder filler. Graphite cloth phenolics can be used. The graphite fiber can be rayon, PAN or pitch based. Suitable commercially available graphite pre-pregs include Fiberite products sold under the designations MXG-175 (graphite which is rayon based) and MX-4961 (graphite which is PAN based). Glass cloth pre-pregs include a glass fiber reinforced phenolic resin such as MXB-6001 from Fiberite. Silica fiber reinforced phenolic resin, such as a product from Fiberite known as MX-2600, can be used.

The pre-preg materials can, if desired, include filler materials. Suitable filler materials include silica, carbon powder and others known to those skilled in the art. Filler materials can serve more than one function. For instance, some fillers, including powdered alumina trihydrate or antimony oxide, may also provide some flame resistance, or other characteristics to the final cured products, but are nonetheless fillers. The present process does not require, and preferably avoids the use of hollow microspheres (and elastomers) in order to produce a low density composite article.

Although the present invention is not limited to production of the carbon-based insulation materials, including the protection liner, by the above-discussed technique, it is noted that this technique produces rocket nozzle components that exhibit remarkable erosion resistance and charring to similar high density products. This technique resides in forming and curing the insulation at sufficiently low pressures to permit the formation of volatiles that generate voids in the resulting product, without requiring low density fillers, such as hollow spheres ("microballoons"). Generally, the cured articles prepared in accordance with this technique have a specific gravity which is lower than a standard density composite rocket nozzle. For instance, with a suitable carbon phenolic resin based pre-preg, a lower density (SpG) in a range of about 1.00 (e.g. 1.03) to about 1.15 g/ml can be prepared, and for other pre-pregs, such as a silica cloth pre-preg, composite rocket nozzle components having densities (SpG) of about 1.35 to 1.49 can be fabricated.

Further, the cured articles of the present invention also exhibit across ply tensile strengths which may be greater than, or at least near to, those observed with well-prepared composites from standard density pre-pregs. For instance, the composite rocket nozzles of our invention can have an across ply tensile strength of about 1800 to about 3000 psig, and more particularly can be readily prepared to have across ply tensile strengths of 1800 to 2200 psig. Across ply properties of the composite material can be tailored by adjusting the pressure used in the initial compaction step and pressure used in the cure step. Such adjustments are techniques that, when viewed in reference to this disclosure, would be within the purview of the skilled artisan without undue experimentation.

Assembly of the nozzle components into the nozzle assembly 20 and engagement of the nozzle assembly 20 with the rocket motor are techniques familiar to skilled artisans.

The foregoing detailed description of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

We claim:

1. A nozzle assembly having a converging/diverging pathway with a throat and an exit region, the nozzle assembly being operatively engageable to a rocket motor case to receive high temperature combustion products generated in the rocket motor case upon ignition of propellant loaded in the rocket motor case and to pass the combustion products through the throat before the combustion products are discharged from the exit region, the nozzle assembly comprising:

(i) an annular throat insert comprising an annular throat support and an annular shell positioned radially inside the throat support, the throat support comprising at least one carbon-based material and having a forward face or edge, a radially inner converging portion that converges into a minimum cross-sectional area portion at the throat, and a radially inner diverging portion aft of the minimum cross-sectional area portion;

(ii) said the shell comprising at least one refractory metal or refractory metal alloy having:

(a) a forward surface region covering at least a portion of the converging portion of the throat support;

(b) a throat surface region covering the minimum cross-sectional area portion of the throat support, the throat surface region defining the throat and exposed along the converging/diverging pathway; and (c) an aft surface region covering at least a portion of the diverging portion of the throat support;

(iii) a protective eyelid comprising at least one member selected from the group consisting of a carbon-based material and a silica-based material, the protective eyelid covering the forward face or edge of the throat support to prevent the combustion products passing along the converging/diverging pathway from reaching a radially outer surface of the throat insert, yet the protective eyelid not covering the throat surface region of the shell so that the throat surface region of the shell remains exposed to the combustion products passing along the converging/diverging pathway during operation of the rocket motor assembly; and (iv) an aft skirt configured as a diverging truncated cone, the aft skirt extending aftwardly from the throat insert.

2. The nozzle assembly of claim 1, wherein the at least one refractory metal or refractory metal alloy has a melting temperature above 2760° C.

3. The nozzle assembly of claim 1, wherein the shell is formed by vacuum plasma spraying.

4. The nozzle assembly of claim 1, wherein the at least one refractory metal or refractory metal alloy comprises a member selected from the group consisting of tungsten, rhenium, tantalum, and alloys thereof.

5. The nozzle assembly of claim 1, wherein the at least one refractory metal or refractory metal alloy comprises a tungsten/rhenium alloy.

6. The nozzle assembly of claim 1, wherein the shell has a thickness of from 0.1 cm to 0.3 cm.

7. The nozzle assembly of claim 1, wherein the forward surface region covers all of the converging portion of the throat support and the aft surface region covers all of the diverging portion of the throat support.

8. The nozzle assembly of claim 1, wherein the protective eyelid covers all of the forward surface region of the shell.

9. A rocket motor assembly comprising:
a rocket motor case comprising a combustion chamber and at least one propellant that is ignitable to generate high temperature combustion products; and
a nozzle assembly having a converging/diverging pathway with a throat and an exit region, the nozzle assembly being operatively engageable with the rocket motor case to receive the combustion products generated from the at least one propellant and to pass the combustion products through the converging/diverging pathway before the combustion products are discharged from the exit region to propel and/or divert the rocket motor assembly, the nozzle assembly comprising:
an annular throat insert comprising an annular throat support and an annular shell positioned radially inside the throat support, the support comprising at least one carbon-based material and having a forward face or edge, a radially inner converging portion that converges into a minimum cross-sectional area portion at the throat, and a radially inner diverging portion aft of the minimum cross-sectional area portion;
the annular shell comprising at least one refractory metal or refractory metal alloy and comprising:
forward surface region covering at least a portion of the converging portion of the throat support;
the throat surface region covering the minimum cross-sectional area portion of the throat support, the throat surface region defining the throat and exposed along the converging/diverging pathway; and
an aft surface region covering at least a portion of the diverging portion of the throat support;
a protective eyelid comprising at least one member selected from the group consisting of a carbon-based material and a silica-based material, the protective eyelid covering a sufficient portion of the forward surface region of the shell to insulate the shell and prevent the combustion products passing along the converging/diverging pathway from reaching a radially outer surface of the throat insert, yet the protective eyelid not covering the throat surface region of the shell so the throat surface region of the shell remains exposed to the combustion products passing along the converging/diverging pathway during operation of the rocket motor assembly; and
an aft skirt configured as a diverging truncated cone, the aft skirt extending aftwardly from the throat insert.

10. The nozzle assembly of claim 9, wherein the at least one refractory metal or refractory metal alloy has a melting temperature above 2760° C.

11. The rocket motor assembly of claim 9, wherein the shell is formed by vacuum plasma spraying.

12. The rocket motor assembly of claim 9, wherein the at least one refractory metal or refractory metal alloy comprises a member selected from the group consisting of tungsten, rhenium, tantalum, and alloys thereof.

13. The rocket motor assembly of claim 9, wherein the at least one refractory metal or refractory metal alloy comprises a tungsten/rhenium alloy.

14. The rocket motor assembly of claim 9, wherein the shell has a thickness of from 0.1 cm to 0.3 cm.

15. The rocket motor assembly of claim 9, wherein the forward surface region covers all of the converging portion of the throat support and the aft surface region covers all of the diverging portion of the throat support.

16. The rocket motor assembly of claim 9, wherein the protective eyelid covers all of the forward surface region of the shell.

17. A method of making a rocket motor nozzle assembly having a converging/diverging pathway with a throat and an exit region, the nozzle assembly being operatively engageable to a rocket motor case to receive high temperature combustion products generated in the rocket motor case upon ignition of propellant loaded in the rocket motor case and to pass the combustion products through the throat before the combustion products are discharged from the exit region, the method comprising:
forming an annular shell by plasma spraying at least one refractory metal or refractory metal alloy; and
forming a rocket motor nozzle comprising:
an annular throat insert comprising an annular throat support and the shell, the throat support comprising at least one carbon-based material and having a forward face or edge, a radially inner converging portion that converges into a minimum cross-sectional area portion at the throat, and a radially inner diverging portion aft of the minimum cross-sectional area portion;
the shell positioned radially inside the throat support and comprising:
a forward surface region covering at least a portion of the converging portion of the throat support;
the throat surface region covering the minimum cross-sectional area portion of the throat support, the throat surface region defining the throat and exposed along the converging/diverging pathway; and
an aft surface region covering at least a portion of the diverging portion of the throat support;
a protective eyelid comprising at least one member selected from the group consisting of a carbon-based material and a silica-based material, the protective eyelid covering a sufficient portion of the forward surface region of the shell to insulate the shell and cover the forward face or edge of the throat support to prevent the combustion products passing along the converging/diverging pathway from reaching a radially outer surface of the throat insert, yet the protective eyelid not covering the throat surface region of the shell so that the throat surface region of the shell remains exposed to the combustion products passing along the converging/diverging pathway during operation of the rocket motor assembly; and an aft skirt configured as a diverging truncated cone, the aft skirt extending aftwardly from the throat insert.

18. The method of claim 17, wherein the at least one refractory metal or refractory metal alloy has a melting temperature above 2760° C.

19. The method of claim 17, wherein the at least one refractory metal or refractory metal alloy comprises a member selected from the group consisting of tungsten, rhenium, tantalum, and alloys thereof.

20. The method of claim 17, wherein the at least one refractory metal or refractory metal alloy comprises a tungsten/rhenium alloy.

21. The method of claim 17, wherein the shell has a thickness of from 0.1 cm to 0.3 cm.

22. The method of claim 17, wherein the forward surface region covers all of the converging portion of the throat support and the aft surface region covers all of the diverging portion of the throat support.

23. The method of claim 17, wherein the protective eyelid covers all of the forward surface region of the shell.

\* \* \* \* \*

UNITED STATES PATENT AND TRADEMARK OFFICE
CERTIFICATE OF CORRECTION

PATENT NO. : 6,711,901 B1
DATED : March 30, 2004
INVENTOR(S) : Alan R. Canfield and John K. Shigley It is certified that error appears in the above-identified patent and that said Letters Patent is hereby corrected as shown below:

Column 5,
Line 52, change "bout" to -- about --
Line 54, change "m of" to -- may be --

Column 7,
Line 2, before "40" change "liner" to -- annular shell --
Line 32, delete "nozzle"

Column 9,
Line 25, change "MX4920" to -- MX-4920 --

Column 10,
Line 4, start a new paragraph with the sentence beginning "For instance,"
Line 39, delete "(i)"
Line 47, delete "(ii) said"
Line 49, delete "(a)"
Line 51, delete "(b)"
Line 55, delete "(c)"
Line 57, delete "(iii)"

Column 11,
Line 3, delete "(iv)"
Line 50, before "forward" insert -- a --

Column 12,
Line 1, after "so" and before "the" insert -- that --

Signed and Sealed this

Fourth Day of January, 2005

JON W. DUDAS
*Director of the United States Patent and Trademark Office*